(12) United States Patent
Hsiao

(10) Patent No.: US 7,212,402 B2
(45) Date of Patent: May 1, 2007

(54) FASTENING DEVICE FOR A DISC DRIVE

(75) Inventor: Tsung-Te Hsiao, Jhunan Township, Miaoli County (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 114 days.

(21) Appl. No.: 11/214,719

(22) Filed: Aug. 31, 2005

(65) Prior Publication Data

US 2007/0047196 A1    Mar. 1, 2007

(51) Int. Cl.
*G06F 1/16* (2006.01)

(52) U.S. Cl. .................... 361/685; 312/223.2
(58) Field of Classification Search ................ 361/685
See application file for complete search history.

(56) References Cited

U.S. PATENT DOCUMENTS 7,016,190 B1 *    3/2006   Chang ................. 361/685

| 2004/0105229 A1* | 6/2004 | Wang et al. ........... 361/685 |
| 2004/0184231 A1* | 9/2004 | Chen ..................... 361/685 |
| 2007/0008693 A1* | 1/2007 | Yeh et al. .............. 361/685 |

* cited by examiner

*Primary Examiner*—Anatoly Vortman
*Assistant Examiner*—Anthony Q. Edwards
(74) *Attorney, Agent, or Firm*—Rosenberg, Klein & Lee

(57) ABSTRACT

A fastening device for retaining a disc drive and being connected with a casing of an electronic product is disclosed. The casing has a recess and a stop portion. The fastening device has a bracket, a resilient latching member, and a resilient locking member. The bracket has a plate body. The resilient latching member is fixed on the plate body and has a first resilient plate. The resilient locking member is fixed on the plate body and has a second resilient plate. The first resilient plate latches on to the disc drive, so that the disc drive and the fastening device are combined. The fastening device and the disc drive are received in the recess of the casing, and the second resilient plate locks on to the stop portion of the casing. As a result, the disc drive is capable of being installed in and removed from the electronic product.

11 Claims, 7 Drawing Sheets

FASTENING DEVICE FOR A DISC DRIVE

BACKGROUND OF THE INVENTION

1. Field of the Invention

The present invention relates to a fastening device for a disc drive, and more particularly, to a fastening device that enables a disc drive to be retained and installed in an electronic product without requiring the use of tools.

2. Background of the Invention

Electronic products are indispensable to people's daily life in the modern world. Consequently, there is a big demand for various types of electronic products, such as desktop computers, barebone systems, and multimedia devices. To satisfy consumers' demands quickly, manufacturers have had to shorten the manufacturing time required for electronic products, for example, the time required for installing a disc drive into an electronic product. Moreover, if the disc drive is damaged, it should be capable of being removed quickly and easily to facilitate its repair, so as to avoid inconvenience for consumers and technicians.

The conventional method for installing a disc drive into an electronic product is to fix the disc drive in a casing of the electronic product by using a number of screws.

An appropriate tool that matches the screws has to be provided when using the above conventional method of installing a disc drive into an electronic product. The tool also has to be used when the disc drive is removed. Moreover, it is very easy that the screws are lost when the disc drive is detached. As a result, it requires more time and effort when installing or removing the disc drive.

SUMMARY OF THE INVENTION

The primary object of the invention is therefore to specify a fastening device for a disc drive that allows a disc drive to be installed in and removed from an electronic product without requiring the use of tools.

According to the invention, the object is achieved via a fastening device for a disc drive. The fastening device retains the disc drive and is connected with a casing of an electronic product. The casing has a recess and a stop portion disposed at an edge of the recess. The fastening device comprises a bracket, a resilient latching member, and a resilient locking member. The bracket has a plate body. The plate body defines an inner surface, an outer surface, and a first edge and a second edge opposite to each other. The disc drive is adjacent to the inner surface and one side thereof is positioned at the first edge of the plate body. The resilient latching member is fixed on the second edge of the plate body. The resilient latching member has a first resilient plate. The first resilient plate latches on to another side of the disc drive. The resilient locking member is fixed on to the outer surface of the plate body. The resilient locking member has a second resilient plate. The second resilient plate and the outer surface of the plate body form a gap therebetween. The fastening device and the disc drive are received in the recess of the casing, and the second resilient plate of the resilient locking member locks on to the stop portion of the casing.

The first resilient plate latches on to the disc drive, and the second resilient plate locks on to the stop portion of the casing, so that the disc drive is capable of being installed in and removed from the electronic product without requiring the use of tools.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention which will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

Figure 1:
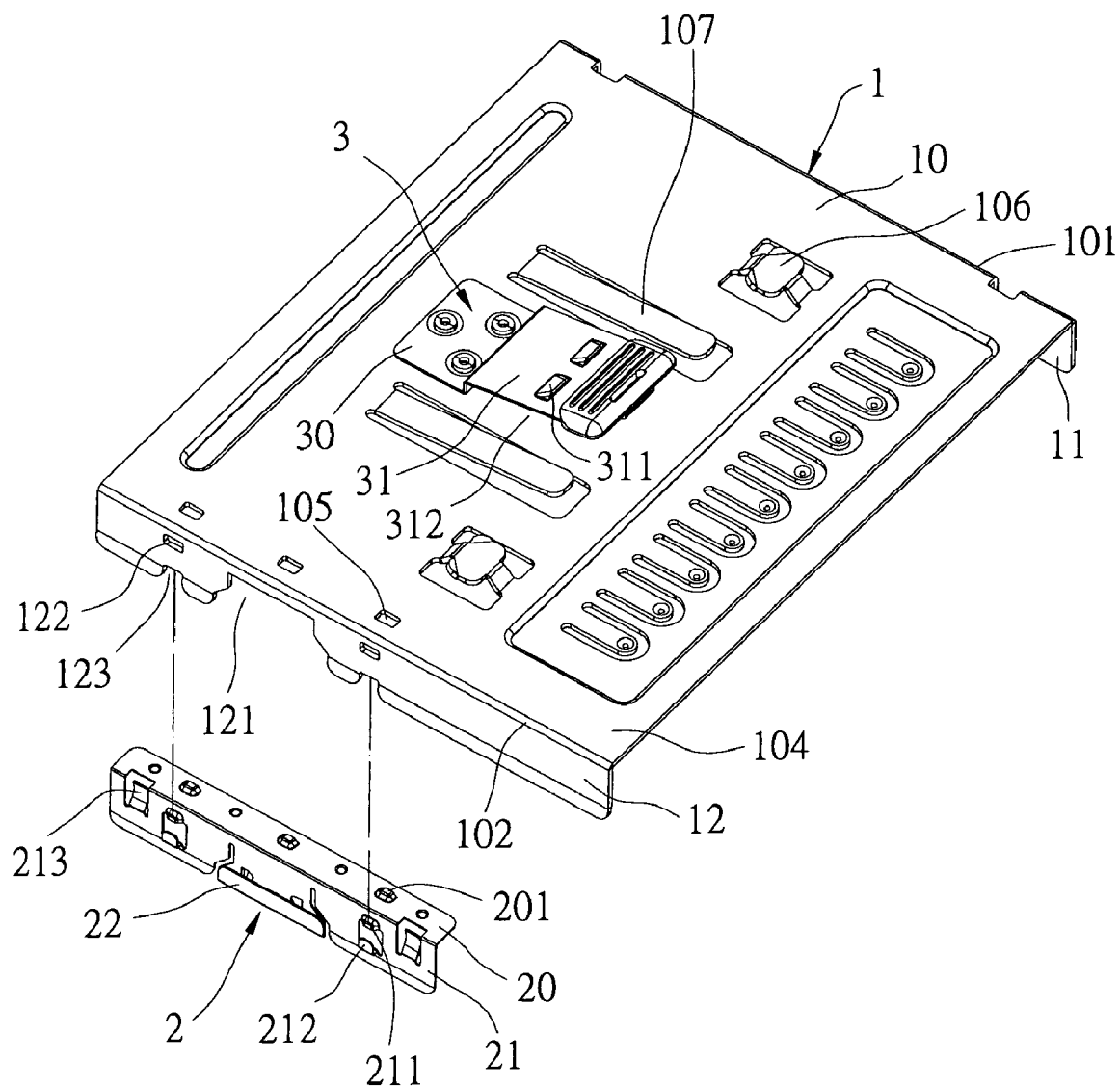
FIG. 1 is an exploded perspective view of a fastening device for a disc drive of the present invention.
Figure 2:
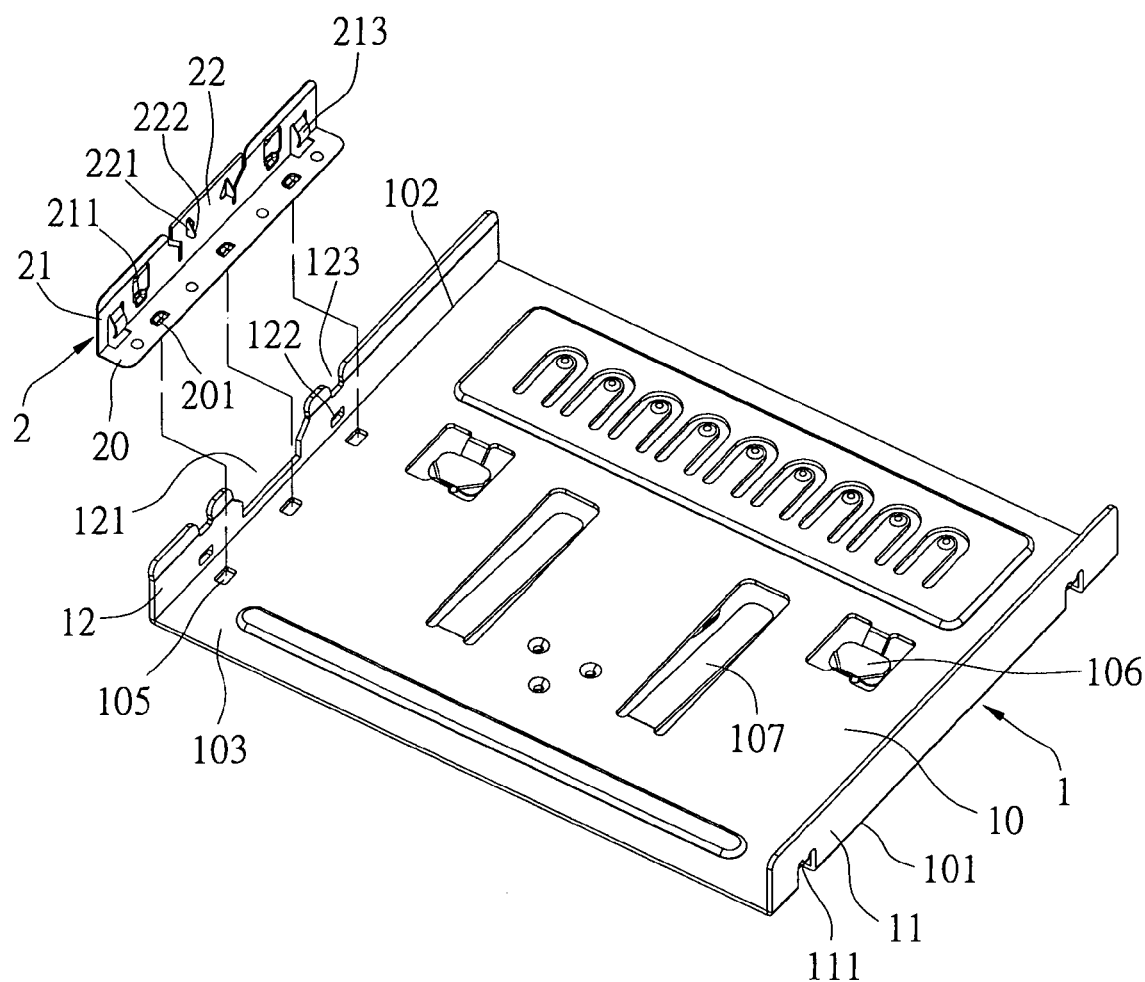
FIG. 2 is another exploded perspective view of a fastening device for a disc drive of the present invention.
Figure 3:
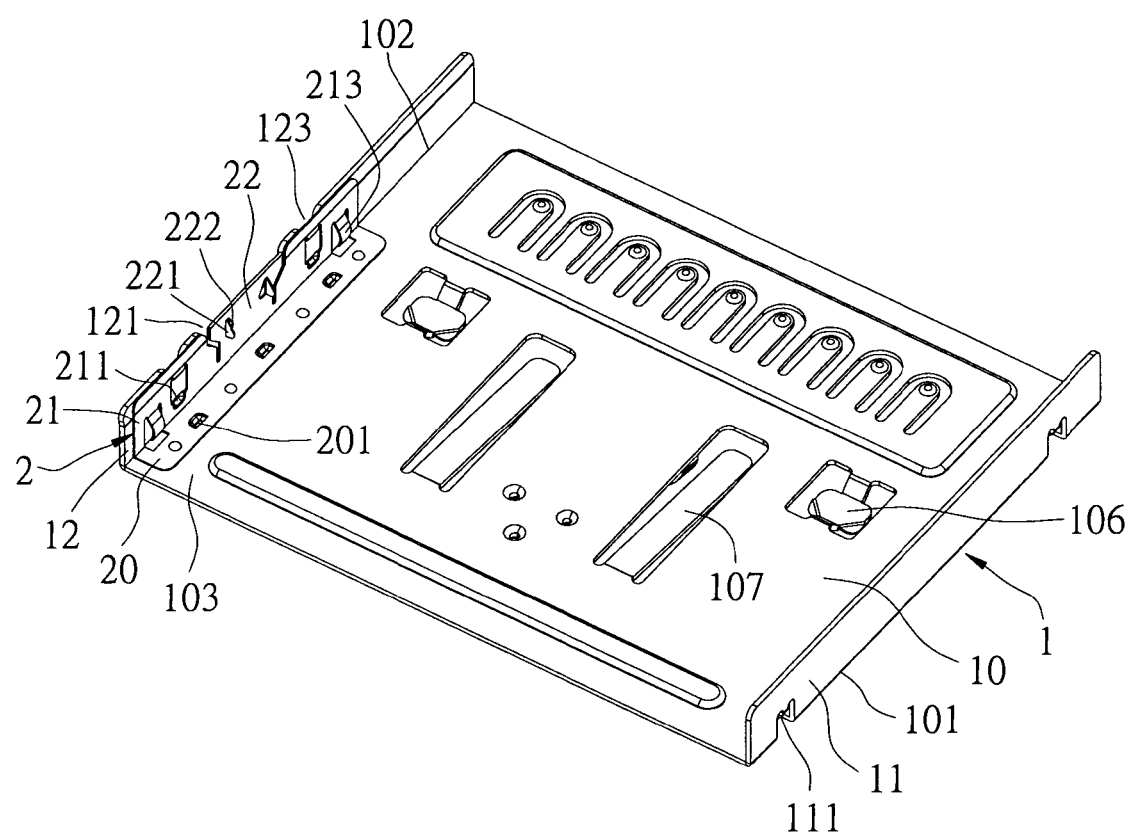
FIG. 3 an assembly perspective view of a fastening device for a disc drive of the present invention.

Referring to FIGS. 1–3, the present invention provides a fastening device for a disc drive. The fastening device comprises a bracket 1, a resilient latching member 2, and a resilient locking member 3.

The bracket 1 has a plate body 10, a first lateral plate 11, and a second lateral plate 12. The plate body 10 defines an inner surface 103, an outer surface 104, and a first edge 101 and a second edge 102 opposite to each other. The first lateral plate 11 connects to the first edge 101 of the plate body 10. The second lateral plate 12 connects to the second edge 102 of the plate body 10.

The plate body 10 has a positioning hole 105 close to the second edge 102 thereof, a guiding portion 106 protruding from the outer surface 104 thereof, and a grounding strip 107 protruding from the outer surface 104 thereof.

The first lateral plate 11 has a positioning pin 111.

The second lateral plate 12 has a notch 121, a positioning hole 122, and a cutout 123.

The resilient latching member 2 has a horizontal portion 20 and a vertical portion 21 integrally connecting with each other, and a first resilient plate 22 formed at the vertical portion 21. The horizontal portion 20 has a positioning projection 201. The vertical portion 21 has a positioning projection 211, a hooking portion 212, and a pressing portion 213. The first resilient plate 22 has a latching portion 221, and the latching portion 221 has a chamfer 222.

The horizontal portion 20 of the resilient latching member 2 is adjacent to the inner surface 103 of the plate body 10 of the bracket 1, and the vertical portion 21 of the resilient latching member 2 is adjacent to an inner surface of the second lateral plate 12 of the bracket 1. The positioning projection 201 of the horizontal portion 20 is fixed in the positioning hole 105 of the plate body 10 of the bracket 1. The positioning projection 211 of the vertical portion 21 is fixed in the positioning hole 122 of the second lateral plate 12 of the bracket 1, and the hooking portion 212 of the vertical portion 21 hooks in the cutout 123 of the second lateral plate 12 of the bracket 1 and is positioned on an outer surface of the second lateral plate 12. In this way, the resilient latching member 2 is reliably fixed on the second edge 102 of the plate body 10, and the first resilient plate 22 of the resilient latching member 2 corresponds to the notch 121 of the second lateral plate 12 of the bracket 1.

The resilient locking member 3 has a fixing portion 30 and a second resilient plate 31. The fixing portion 30 integrally connects with the second resilient plate 31. The second resilient plate 31 has a protrusion 311.

The fixing portion 30 of the resilient locking member 3 is fixed on to the outer surface 104 of the plate body 10 of the bracket 1. The second resilient plate 31 of the resilient locking member 3 and the outer surface 104 of the plate body 10 form a gap 312 therebetween thereby allowing movement of the second resilient plate 31.

Figure 8:
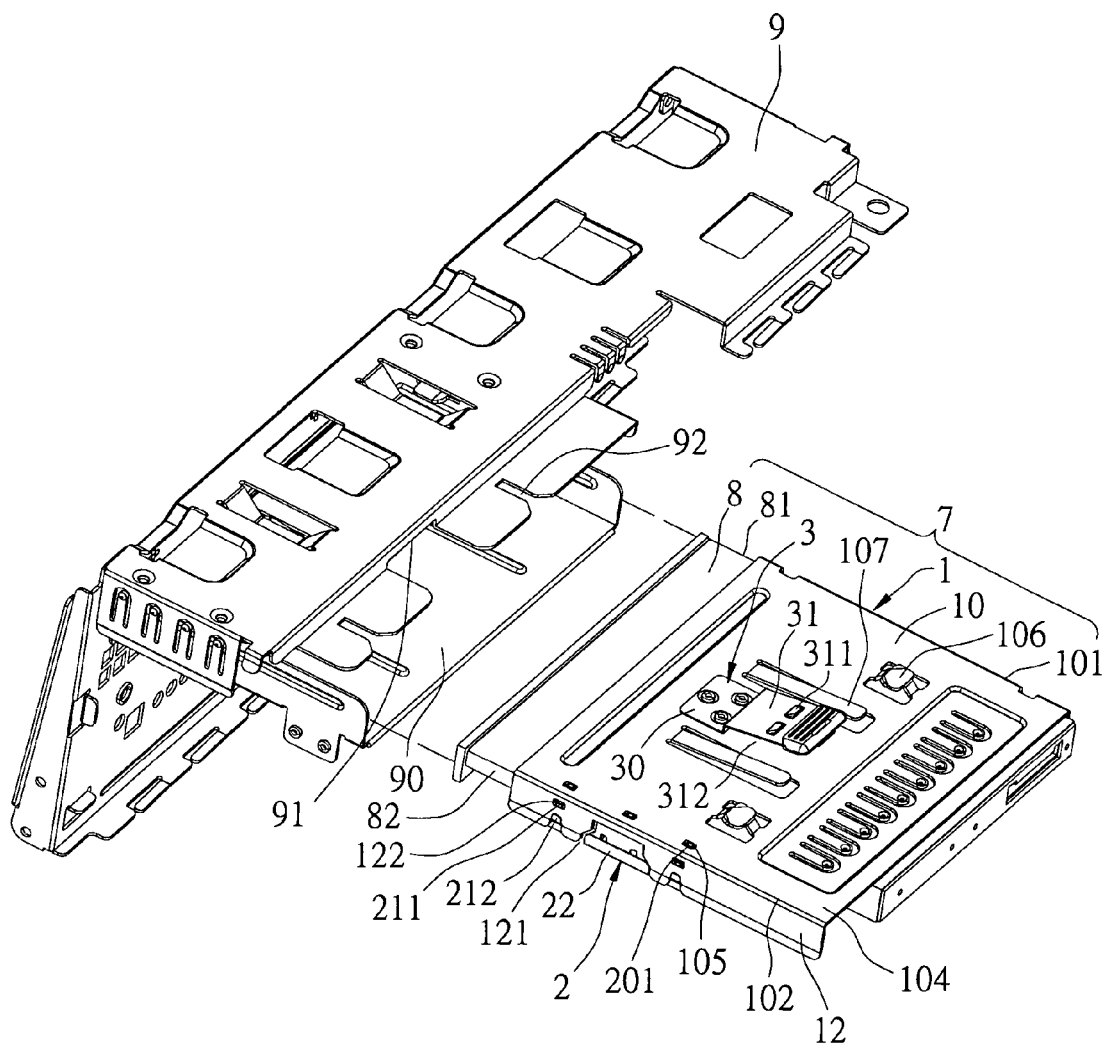
FIG. 8 is an exploded perspective view showing a disc drive being installed in a fastening device of the present invention and a casing of an electronic product.
Figure 9:
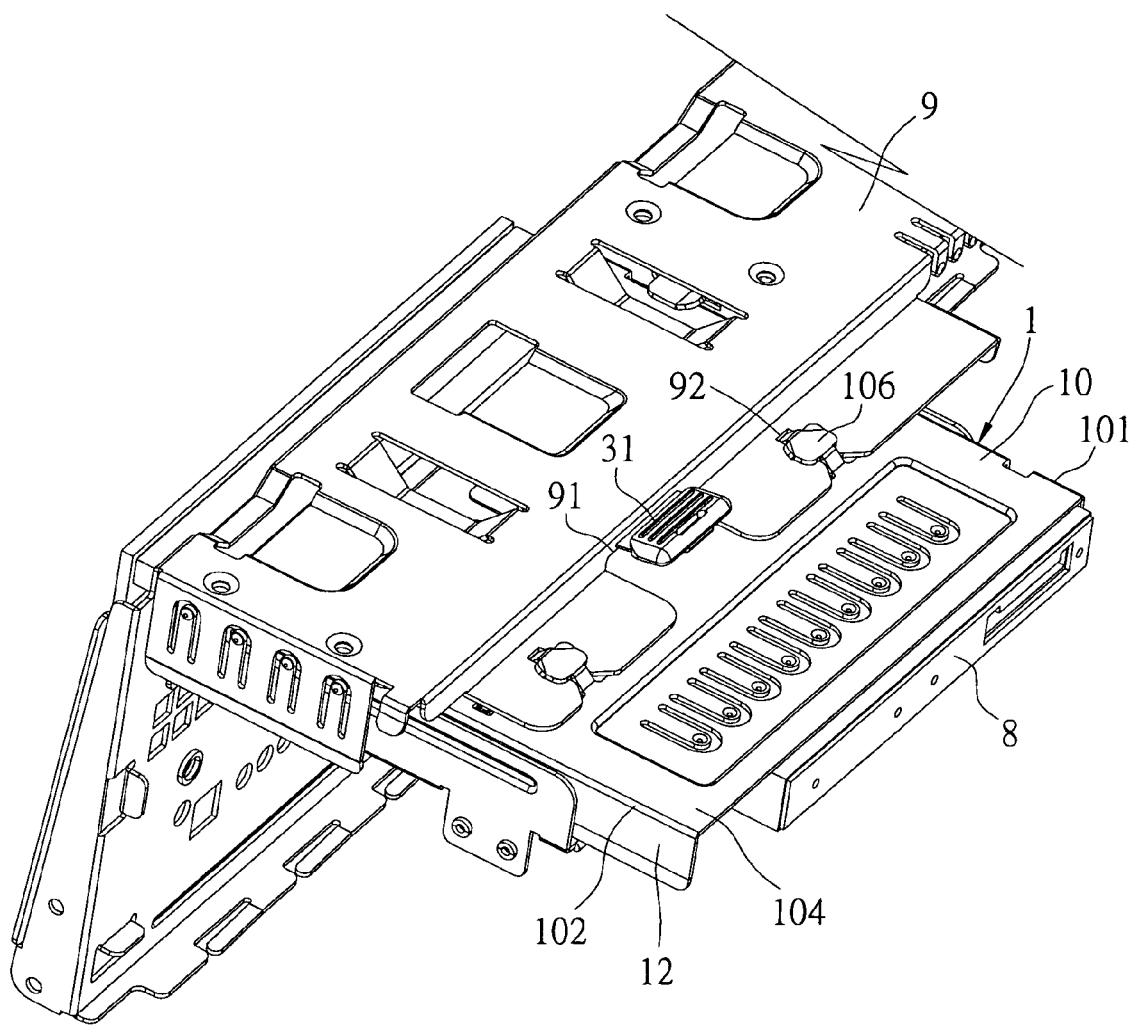
FIG. 9 is an assembly perspective view showing a disc drive being installed in a fastening device of the present invention and a casing of an electronic product.

Reference is made to FIG. 8 and FIG. 9. The fastening device for a disc drive of the present invention retains a disc drive 8 and is connected with a casing 9 of an electronic product. The casing 9 has a recess 90, a stop portion 91 disposed at an edge of the recess 90, and a guiding groove 92 disposed in the edge of the recess 90.

Figure 4:
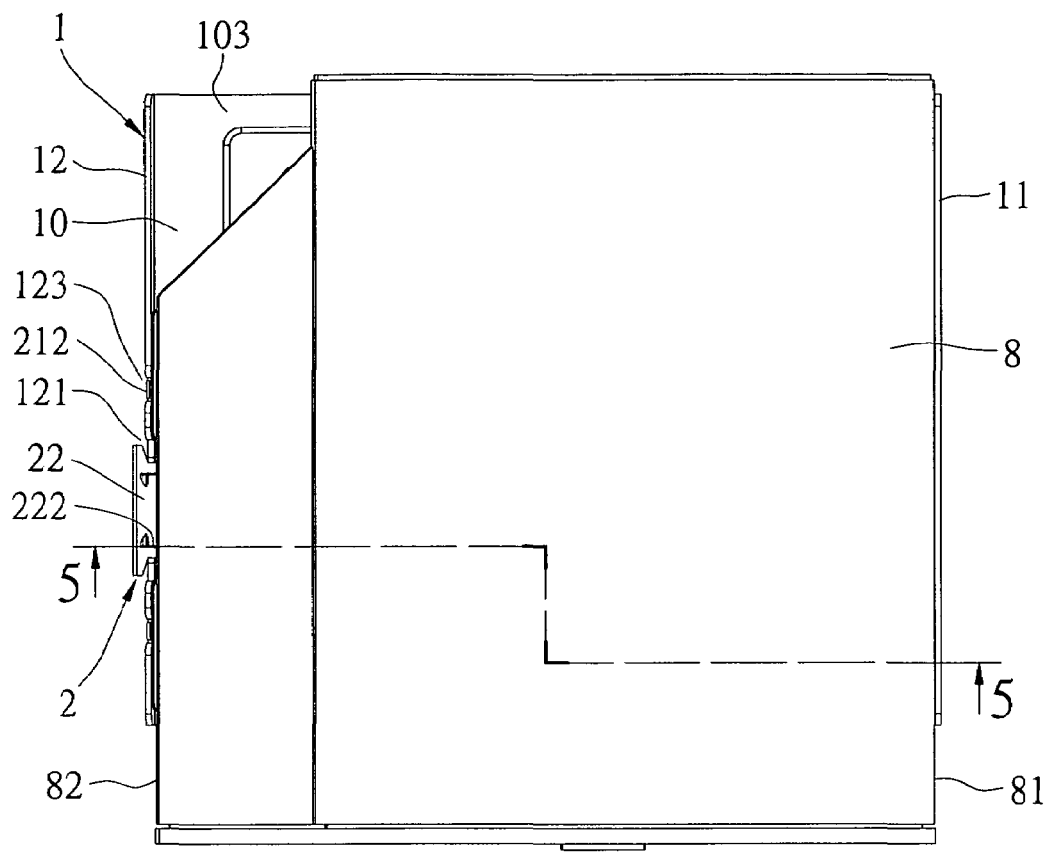
FIG. 4 is a schematic planar view showing a disc drive being installed in a fastening device of the present invention, in which the first resilient plate of the resilient latching member of the fastening device has not been latched on to the disc drive.
Figure 5:
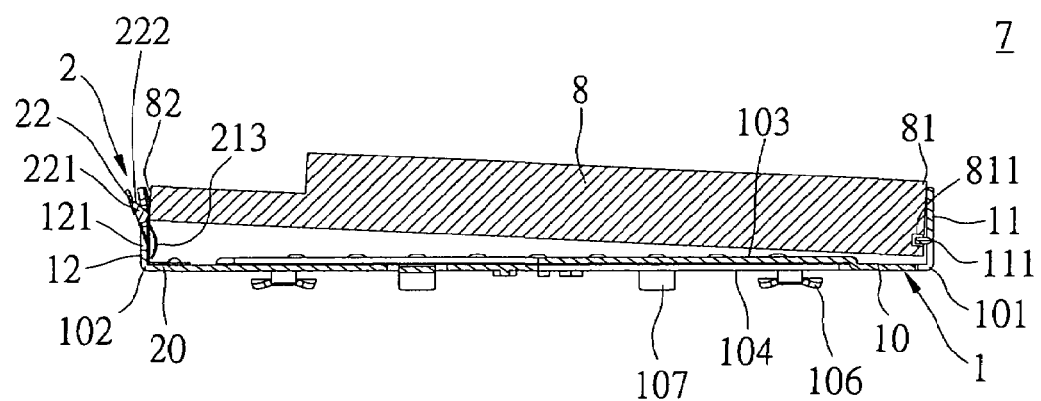
FIG. 5 is a cross-sectional view taken along line 5—5 of FIG. 4.

Referring to FIG. 4 and FIG. 5, the disc drive 8 is installed in the fastening device at an appropriate inclined angle. First, one side 81 of the disc drive 8 is placed adjacent to an inner surface of the first lateral plate 11 of the bracket 1. The one side 81 of the disc drive 8 has a fixing hole 811, and the positioning pin 111 of the first lateral plate 11 is inserted in the fixing hole 811, so that the one side 81 of the disc drive 8 is positioned at the first edge 101 of the plate body 10 of the bracket 1. Meanwhile, another side 82 of the disc drive 8 is adjacent to the chamfer 222 of the latching portion 221 of the first resilient plate 22 of the resilient latching member 2.

Figure 6:
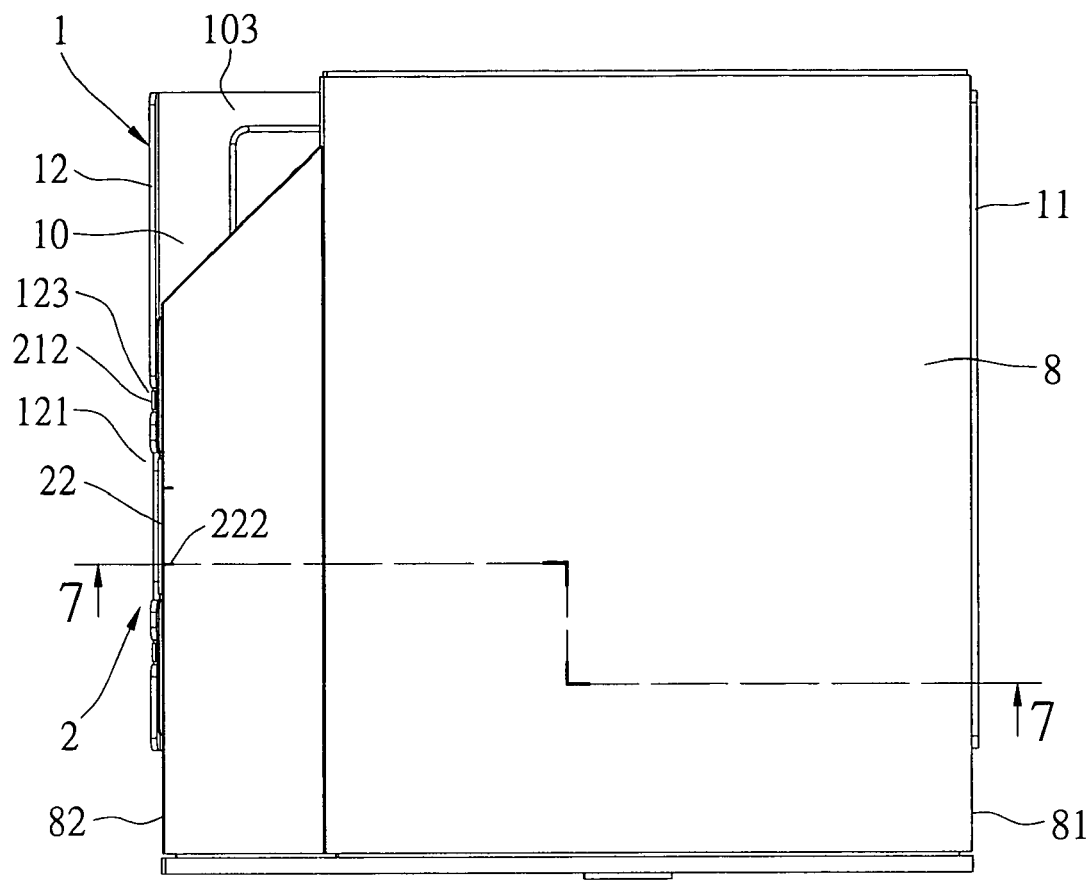
FIG. 6 is a schematic planar view showing a disc drive being installed in a fastening device of the present invention, in which the first resilient plate of the resilient latching member of the fastening device has been latched on to the disc drive.
Figure 7:
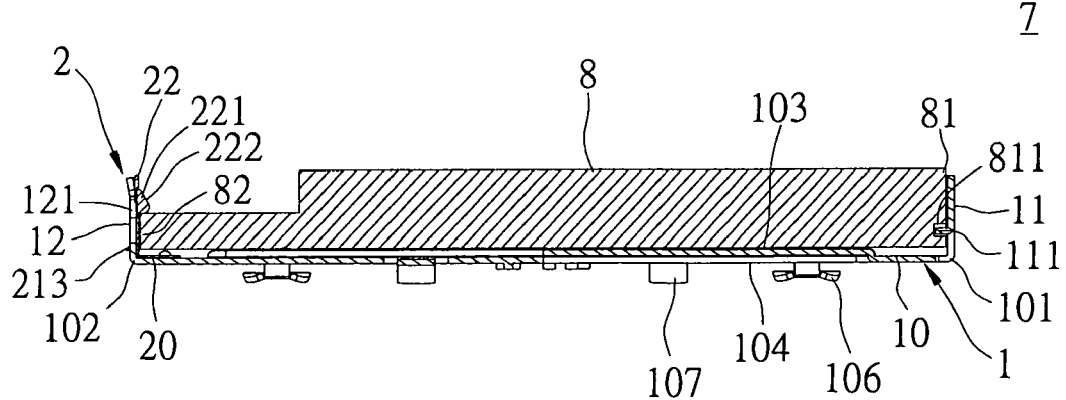
FIG. 7 is a cross-sectional view taken along line 7—7 of FIG. 6.

Next, referring to FIG. 6 and FIG. 7, the another side 82 of the disc drive 8 is pressed toward the bracket 1, so that the disc drive 8 is adjacent to the inner surface 103 of the plate body 10 of the bracket 1. In this way the latching portion 221 of the first resilient plate 22 latches on to the another side 82 of the disc drive 8. Furthermore, the disc drive 8 and the fastening device are assembled to become a disc drive module 7. Meanwhile, the pressing portion 213 of the second lateral plate 12 of the bracket 1 abuts against the another side 82 of the disc drive 8. Installation of the disc drive 8 is therefore more reliable and the bracket 1 has a grounding effect.

Next, referring to FIG. 8 and FIG. 9, the guiding portion 106 of the plate body 10 of the bracket 1 is guided into the guiding groove 92 of the casing 9. In this way the disc drive module 7 that is assembled from the fastening device and the disc drive 8 is received in the recess 90 of the casing 9. Furthermore, the protrusion 311 of the second resilient plate 31 of the resilient locking member 3 locks on to the stop portion 91 of the casing 9. Therefore the disc drive module 7 is reliably installed in the casing 9. Meanwhile, the grounding strip 107 of the plate body 10 of the bracket 1 contacts the casing 9. Therefore the installation of the disc drive module 7 is more reliable, and the bracket 1 has a grounding effect.

When the disc drive 8 is removed from the casing 9, the second resilient plate 31 of the resilient locking member 3 is initially pressed toward the plate body 10 of the bracket 1. The protrusion 311 of the second resilient plate 31 is therefore separated from the stop portion 91 of the casing 9. Next, the disc drive module 7 is drawn out from the recess 90 of the casing 9. The first resilient plate 22 of the resilient latching member 2 can then be pulled outwardly, so that the latching portion 221 of the first resilient plate 22 is separated from the disc drive 8. Finally, the disc drive 8 can be removed from the fastening device at an appropriate inclined angle.

According to the above description, the disc drive 8 is capable of being installed in and removed from the casing 9 of the electronic product without requiring the use of tools.

As indicated above, the fastening device for a disc drive of the present invention has the following advantages:

1. The first resilient plate latches on to the disc drive, and the second resilient plate locks on to the stop portion of the casing, so that the disc drive is capable of being installed in and removed from the electronic product without requiring the use of tools.

2. The positioning pin of the first lateral plate of the bracket is inserted in the fixing hole of the disc drive, so that the disc drive is more easily installed and removed.

3. The guiding portion of the plate body of the bracket is guided into the guiding groove of the casing, so that the disc drive module can be installed and removed more smoothly.

4. The pressing portion of the second lateral plate of the bracket and the grounding strip of the plate body respectively make for a more reliable installation of the disc drive and the disc drive module. It also ensures that the bracket has a grounding effect.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A fastening device for a disc drive, the fastening device retaining the disc drive and being connected with a casing of an electronic product, the casing having a recess and a stop portion disposed at an edge of the recess, the fastening device comprising:

a bracket having a plate body, the plate body defining an inner surface, an outer surface, and a first edge and a second edge opposite to each other, and the disc drive being adjacent to the inner surface and one side thereof being positioned at the first edge of the plate body;

a resilient latching member fixed on the second edge of the plate body, the resilient latching member having a first resilient plate, and the first resilient plate latching on to another side of the disc drive; and a resilient locking member fixed on to the outer surface of the plate body, the resilient locking member having a second resilient plate, and the second resilient plate and the outer surface of the plate body forming a gap therebetween; wherein the fastening device and the disc drive are received in the recess of the casing, and the second resilient plate of the resilient locking member locks on to the stop portion of the casing.

2. The fastening device as claimed in claim 1, wherein the bracket has a first lateral plate connecting with the first edge of the plate body, the first lateral plate has a positioning pin, said one side of the disc drive has a fixing hole, and the positioning pin is inserted in the fixing hole.

3. The fastening device as claimed in claim 1, wherein the bracket has a second lateral plate connecting with the second edge of the plate body, the second lateral plate has a notch, the resilient latching member has a horizontal portion and a vertical portion integrally connecting with each other, the horizontal portion is adjacent to the inner surface of the plate body, the vertical portion is adjacent to an inner surface of the second lateral plate, and the first resilient plate is formed at the vertical portion and corresponds to the notch.

4. The fastening device as claimed in claim 3, wherein the plate body of the bracket has a positioning hole, the horizontal portion of the resilient latching member has a positioning projection, and the positioning projection is fixed in the positioning hole.

5. The fastening device as claimed in claim 3, wherein the second lateral plate of the bracket has a positioning hole and a cutout, the vertical portion of the resilient latching member has a positioning projection and a hooking portion, the positioning projection is fixed in the positioning hole, and the hooking portion hooks in the cutout and is positioned on an outer surface of the second lateral plate.

6. The fastening device as claimed in claim 3, wherein the vertical portion of the resilient latching member has a pressing portion, and the pressing portion abuts against said another side of the disc drive.

7. The fastening device as claimed in claim 3, wherein the first resilient plate of the resilient latching member has a latching portion, the latching portion has a chamfer, and the latching portion latches on to said another side of the disc drive.

8. The fastening device as claimed in claim 1, wherein the second resilient plate of the resilient locking member has a protrusion, and the protrusion locks on to the stop portion of the casing.

9. The fastening device as claimed in claim 8, wherein the resilient locking member has a fixing portion integrally connecting with the second resilient plate, and the fixing portion is fixed on the outer surface of the plate body of the bracket.

10. The fastening device as claimed in claim 1, wherein the plate body of the bracket has a guiding portion protruding from the outer surface thereof, the casing has a guiding groove disposed in the edge of the recess, and the guiding portion is guided in the guiding groove.

11. The fastening device as claimed in claim 1, wherein the plate body of the bracket has a grounding strip protruding from the outer surface thereof, and the grounding strip contacts the casing.

* * * * *